United States Patent [19]

Holl et al.

[11] Patent Number: 5,322,146
[45] Date of Patent: Jun. 21, 1994

[54] FRICTION BRAKE FOR VEHICLES

[75] Inventors: Eberhard Holl, Schwieberdingen; Frieder Keller, Bretten; Steffen Kaehler, Kornwestheim; Claus Kramer, Besigheim; Hermann Winner, Karlsruhe, all of Fed. Rep. of Germany

[73] Assignee: Robert Bosch GmbH, Stuttgart, Fed. Rep. of Germany

[21] Appl. No.: 28,875

[22] Filed: Mar. 10, 1993

[30] Foreign Application Priority Data

Mar. 11, 1992 [DE] Fed. Rep. of Germany ....... 4207640

[51] Int. Cl.[5] .......................... B60T 13/74; B60T 1/06
[52] U.S. Cl. .......................... 188/71.2; 188/72.2; 188/72.7; 188/138; 188/156; 192/35
[58] Field of Search ............. 188/72.1, 72.2, 72.7, 188/156, 158, 137, 138, 161, 163, 71.2; 192/35, 93 A, 12 D

[56] References Cited

U.S. PATENT DOCUMENTS

| 1,480,239 | 1/1924 | Chaplin | 192/35 |
|---|---|---|---|
| 3,952,843 | 4/1976 | Campbell et al. | 192/93 A X |
| 4,266,445 | 5/1981 | Goscenski, Jr. | 192/35 X |
| 4,267,903 | 5/1981 | Kita et al. | 188/72.7 X |
| 4,284,176 | 8/1981 | Haraikawa et al. | 188/72.7 X |
| 5,107,967 | 4/1992 | Fujita et al. | 188/72.1 |
| 5,154,261 | 10/1992 | Tanaka et al. | 188/72.1 X |

FOREIGN PATENT DOCUMENTS

| 0177767 | 4/1986 | European Pat. Off. . |
| 4021572 | 1/1991 | Fed. Rep. of Germany . |
| 0296020 | 12/1990 | Japan ................... 188/163 |

Primary Examiner—Robert J. Oberleitner
Assistant Examiner—Peter M. Poon
Attorney, Agent, or Firm—Edwin E. Greigg; Ronald E. Greigg

[57] ABSTRACT

A disk brake has an electromagnetic friction clutch that is brought into controllable frictional engagement with a brake disk. The friction clutch is in form-fitting rotational engagement with a piston of a clamping device for the friction linings associated with the brake disk, the piston is axially displaceable by a key driver that is independent of the direction of rotation. To press the friction linings against the brake disk, energy is provided by the rotating vehicle wheel by the friction clutch and metered to the clamping device. The friction brake can be used in passenger cars, for example.

7 Claims, 3 Drawing Sheets

FRICTION BRAKE FOR VEHICLES

RELATED APPLICATION

This application relates to subject matter generally similar to another application filed simultaneously by the same assignee, the application being identified by German Patent Appl. No. P 42 07 641.2, reference no. R.25089, and further identified by Ser. No. 08/028,874 filed in the U.S. Patent and Trademark Office on Mar. 10, 1993.

BACKGROUND OF THE INVENTION

The invention is based on a friction brake and to a method for braking a vehicle equipped with at least one friction brake as described hereinafter.

Such a friction brake in the form of a disk brake is already known (German DE 40 21 572 A1), U.S. Pat. No. 5,107,967, in which an electric motor acts as the drive source for the clamping device. Its motor shaft is connected by a non-shiftable coupling to a worm of a worm gear whose worm wheel is seated on a recirculating ball screw that indirectly engages the piston of the clamping device. The clamping power for this friction brake must therefore be provided solely by the electric motor. Because limited space is available for it inside the wheel rim of the vehicle wheel, only a relatively small electric motor can be used. For a motor with limited capacity to generate the necessary clamping power, the worm gear must have a high transmission ratio. As a consequence, the brake reacts relatively sluggishly to braking signals. Although it would be possible to increase the dynamics of the friction brake by putting a higher load on the electric motor, this would result in negative repercussions on the electrical system of the vehicle. Moreover, a considerable disadvantage is the self-locking action of the worm gear, so that an electric motor is also required to release the brake. A non-self-releasing brake, however, represents a potentially serious danger.

It is further known (EP 0 177 767 A1) to provide vehicles with a hydraulic deceleration device triggered by the driver in the form of a service brake. In this case, a positive displacement pump is used that is disposed in a wheel hub, on the delivery side of which a device for generating a counterpressure is positioned, and a cooling device is downstream of the device. The pump can have an adjustable volumetric displacement and be triggered by a servo motor. Such a brake has limited dynamics. Moreover, the hydraulic deceleration device is also subject to losses in the non-braking state In addition, the cooling device requires a great deal of space.

OBJECT AND SUMMARY OF THE INVENTION

In contrast, the friction brake in accordance with the invention has an advantage that it can be triggered with very low power output, because the energy required to provide the clamping power for the clamping device is drawn from the vehicle wheel to be braked. This drawing of energy already contributes to braking. The clamping power is adjustable with very high dynamics. Only a fraction of one wheel rotation is required for the buildup of the clamping power. A particular advantage, however, is the design of the mechanical transmission means between the friction clutch and the piston of the clamping device, which can be achieved in a simple manner and is non-self-locking. Therefore, no electrical control energy is required to release the brake. A very important advantage is that the friction brake in accordance with the invention can be used for driving in reverse as well, because the piston of the clamping device executes a feed motion toward the friction member in both directions of rotation. In the non-braking time the friction brake is free of power loss.

The method in accordance with the invention is distinguished in that, during braking, an energy source for controlling the friction clutch is only under a light load; during the remaining non-braking time, the vehicle is not subjected to a loss in power caused by the brake.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
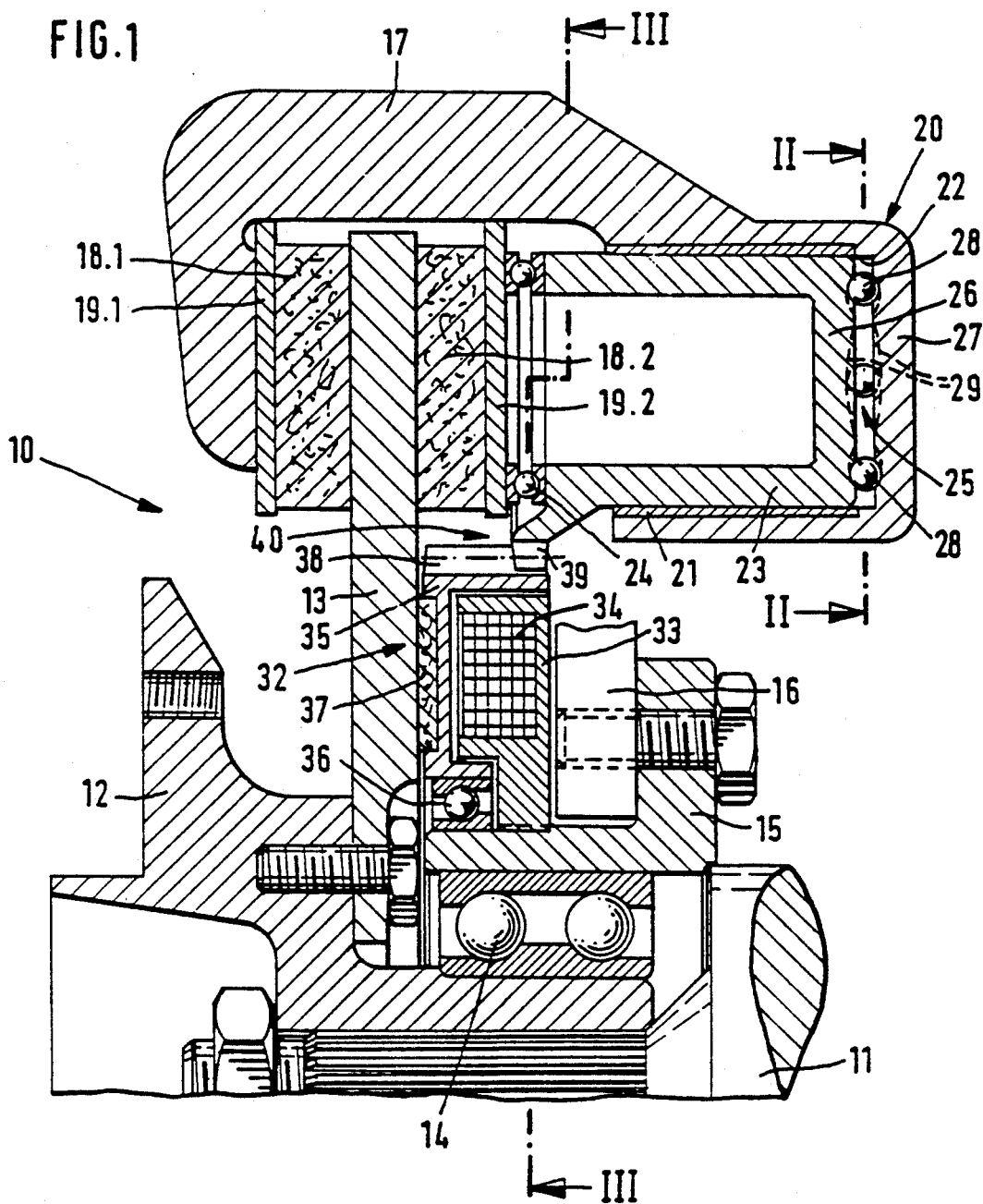
FIG. 1 shows a semi-sectional view of a friction brake with a friction clutch engaging a friction member for operating a clamping device.
Figure 2:
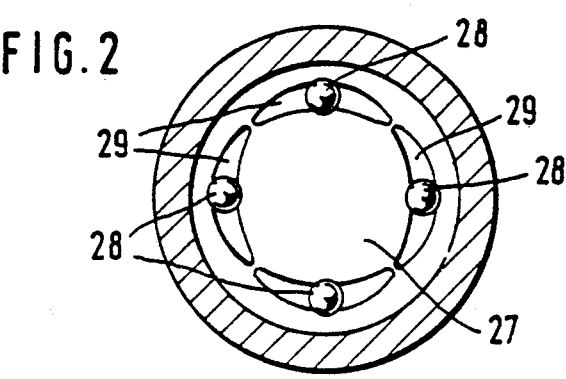
FIG. 2 shows a section through the clamping device along the line II—II in FIG. 1.
Figure 3:
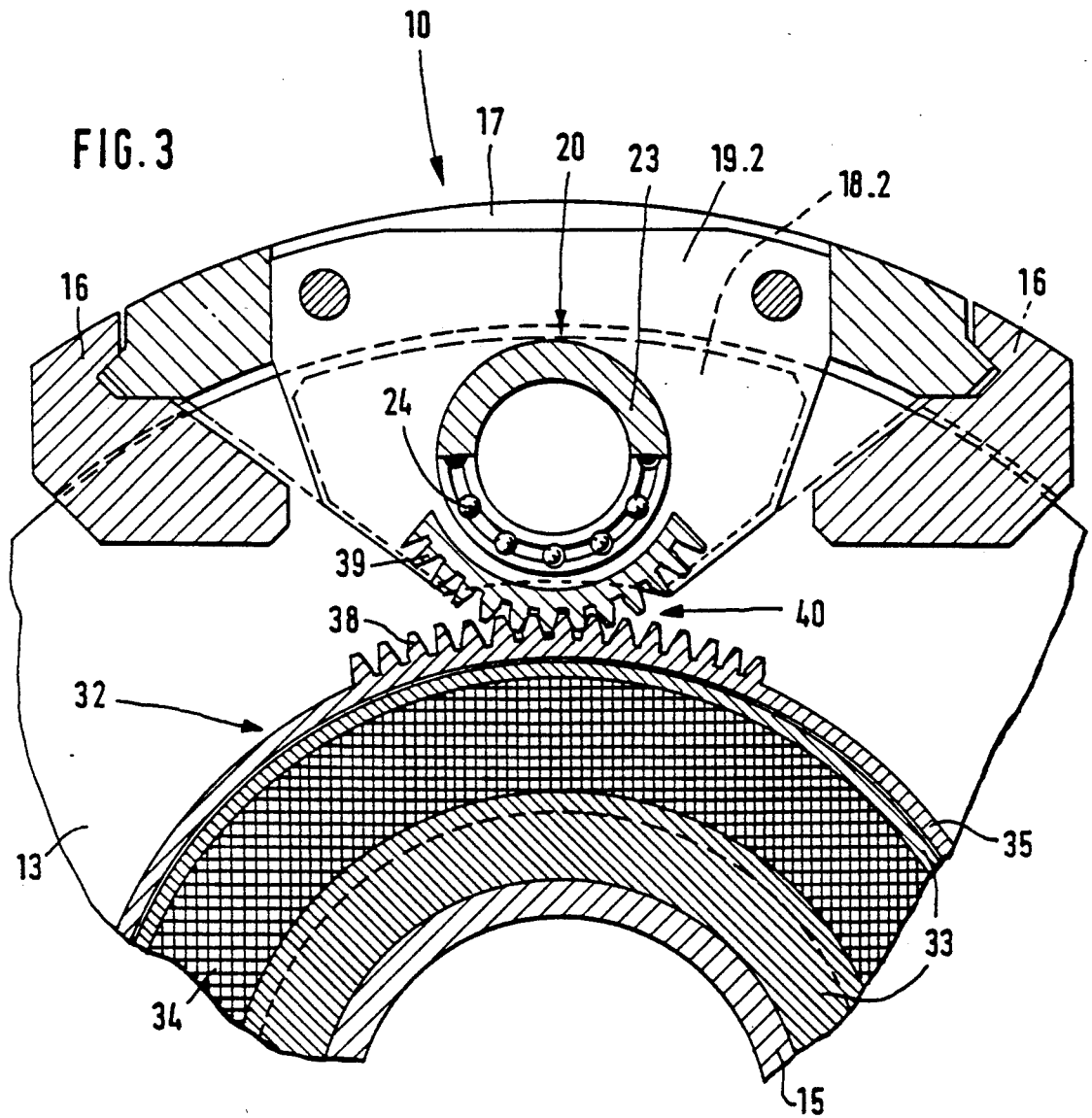
FIG. 3 shows a section through the friction brake along the line III—III in FIG. 1.

The exemplary embodiment represented in FIGS. 1 through 3 of the drawings has as its subject a disk brake 10 as a friction brake for a vehicle that is not represented, such as an automobile. The vehicle has a wheel axle 11, on which a wheel hub 12 is disposed, fixed against relative rotation (FIG. 1). The hub 12 is designed to receive the wheel rim of a vehicle wheel (not represented). Coaxially with the wheel axle, a brake disk 13 is secured onto the wheel hub 12, fixed against relative rotation, acting as a friction member of the disk brake 10. The wheel axle 11, the wheel rim 12 with the vehicle wheel and the disk brake 13 are rotatably seated by means of a wheel bearing 14 in a steering knuckle 15 (only partly represented) of the vehicle. A brake anchor plate 16 is secured to the steering knuckle 15. A pincer-like floating caliper 17 that overlaps the brake disk 13 is seated such that it is movable parallel to the wheel axle 11 in the brake anchor plate 16. Friction linings 18.1 and 18.2 with backplates 19.1 and 19.2 are received in the floating caliper 17 on both opposite sides of the brake disk 13. Moreover, the floating caliper 17 is equipped with a clamping device 20 for pressing the friction linings 18.1 and 18.2 against the brake disk 13. For this purpose the clamping device 20 has a piston 23, which is received with little friction in a bushing-shaped friction bearing 21 of a cylinder 22 of the floating caliper 17. The piston of the clamping device 20, which is both longitudinally movable parallel to the wheel axle 11 and rotatable around its longitudinal axis, engages the backplate 19.2 of the associated friction lining 18.2 by means of an axially grooved bearing 24. On the side remote from the friction lining, the clamping device 20 has a key driver 25 that is independent of the direction of rotation, for the axial displacement of the piston 23. The key driver 25 has balls 28 that are disposed as roll bodies between a piston bottom 26 and the cylinder bottom 27, evenly distributed along a circle extending coaxially with respect to the piston 23. The roll bodies are supported on the roll surfaces 29 of the piston bottom 26 and the cylinder bottom 27, which form leading ramps. The two roll surfaces 29, which extend in both directions of rotation from a represented resting position of the balls 28, run along the aforementioned circle in both directions of rotation with the same inclination with respect to the planes of the piston bottom 26 and the cylinder bottom 27 (FIG. 2).

The disk brake 10 is provided with an electromagnetic friction clutch 32 which connects the clamping device 20 with a drive source. The friction clutch 32, disposed on the same axis with respect to the wheel axle 11, has a stationary coupling half 33, which is connected with the steering knuckle 15, and in which an electric coil 34 for the generation of a magnetic field is received. The other coupling half 35 of the friction clutch 32 is disposed between the one coupling half 33 and the brake disk 13. The coupling half 35, which is rotatably and axially movably seated on the steering knuckle 15 by means of a coupling bearing 36, has a friction lining 37 on the side of the brake disk 13. The other coupling half 35, which overlaps the one coupling half 33 on the circumferential side, is provided with a toothed wheel segment 38 in the area of its circumference adjacent to the floating caliper 17. The piston 23, which on the side of the friction lining along part of the circumference is likewise provided with a toothed wheel segment 39, is in form-locking rotational engagement with this toothed wheel segment 38 (FIG. 3). This pinion gear 40 formed in this way between the friction clutch 32 and the clamping device 20 is represented in the drawing in a position in which the disk brake 10 is inactive.

MODE OF OPERATION

For decelerating the vehicle wheel connected with the wheel hub 12 or the vehicle, the friction linings 18.1 and 18.2 of the disk brake 10 can be pressed in a known manner against the brake disk 13, which is connected in a manner fixed against relative rotation on the same axle as the vehicle wheel, by means of the clamping device 20. The rotating vehicle wheel acts as a drive source for the clamping device 20. For this purpose the energy at the rotating vehicle wheel is taken up by means of the infinitely variable friction clutch 32 and metered to the mechanical transmission means, that is, the pinion gear 40 and the key driver 25 of the clamping device 20, as follows: to initiate braking, a magnetic field is generated in the field coil 34 of the coupling half fixedly disposed on the steering knuckle 15, by means of which the other coupling half 35, which is rotatably seated on the steering knuckle 15, is brought into frictional engagement with the brake disk 13. The torque transmitted from the brake disk 13 to the coupling half 35 effects a rotating movement of this coupling half that amounts to a fraction of one revolution. The rotating movement of the coupling half 35 is transmitted via the pinion gear 40 to the piston 23 of the clamping device 20. When the piston 23 is rotated, the balls 28 roll off on the roll surfaces 29 so that the balls reach roll surfaces of lesser cut-in depth and force an axial displacement on the piston 23. On the one hand, the piston 23 transmits this axial stroke to the friction lining 18.2 via the axially grooved bearing 24 and, on the other hand, to the friction lining 18.1 via the key driver 25 and the floating caliper 17. The brake disk 13 rotating between the friction linings 18.1 and 18.2 is decelerated as a function of the clamping power. Accordingly, the vehicle wheel equipped with the disk brake 10 is also decelerated.

The moment and thus the clamping power of the friction linings 18.1 and 18.2, which can be transmitted from the friction clutch 32, are adjustable with the help of the exciting current in the field coil 34. The coupling moment is independent of the rpm difference between the coupling half 35 and the brake disk 13 within certain limits, and therefore independent of the speed of rotation of the vehicle wheel that is provided with the disk brake 10. With a vehicle provided with such a disk brake 10, the desired deceleration during braking is directly adjustable with the aid of the electrical current for triggering the coupling half 32.

The gear ratio of the mechanical transmission means, that is, the pinion gear 40 and key driver 25, between the friction clutch 32 and the clamping device 20 is selected in such a way that the rolling path of the vehicle wheel and thus the reaction time between initiation of braking and the beginning of the braking effect, which is necessary for clamping the friction linings 18.1 and 18.2, becomes very short. Moreover, the seating of the coupling half 35, of the piston 23, the pinion gear 40 and the key driver 25, and of the axially grooved bearing 24 is designed to have very little friction, so that during brake release, i.e., when reducing or ending the frictional lockup between the coupling half 35 and the brake disk 13, the aforementioned elements of the disk brake 10 can return automatically to their resting position, and the friction linings 18.1 and 18.2 can release the brake disk 13.

The braked vehicle wheel can also be kept stationary with the disk brake 10 when the vehicle is stopped by maintaining the magnetic field of the friction clutch 32, so that the coupling half 35 remains in frictional lockup with the brake disk 13 and activates the clamping device 20. Because of the pinion gear 40, which is effective in both directions of rotation of the vehicle wheel, and the key driver 25, which is independent of the direction of rotation, the disk brake 10 is also usable when the vehicle is moving in reverse.

During braking heat loss occurs because of the frictional slippage between the friction lining 37 of the coupling half 35 and the brake disk 13, and is dissipated through the brake disk, around which air circulates. In the non-braking position, on the other hand, the frictional lockup between the clutch 32 and the brake disk 13 is canceled.

To maintain the effect of the disk brake 10, even when the friction linings 18.1 and 18.2 are becoming worn, it is necessary to equip the disk brake 10 with a wear compensation device. It is useful to dispose the compensation device (not shown) in the area of the clamping device 20. It can be formed by the piston 23 that lengthens depending on the wear on the friction lining, for example.

Figure 4:
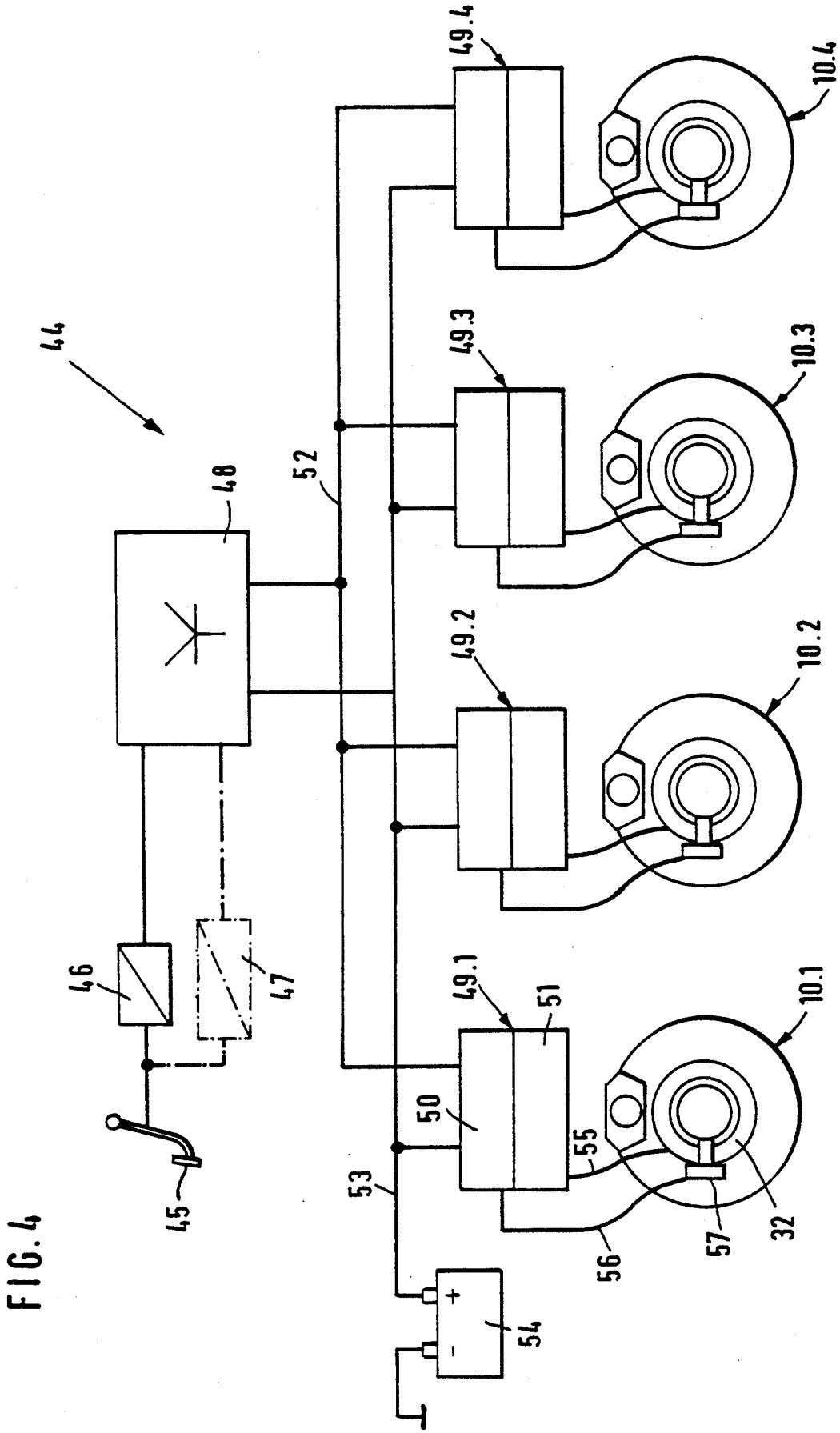
FIG. 4 is a schematic drawing of a brake system of a vehicle that is provided with friction brakes of this type.

A brake system 44 shown in FIG. 4 for a passenger car, for example, has four disk brakes 10.1 through 10.4 of the type described above. The brake system 44 is operable by means of a brake pedal 45, which acts on a pressure transducer 46. Instead of the pressure transducer 46, a travel or force simulator 47 can be in engagement with the brake pedal 45. The pressure transducer 46 or the simulator 47 is connected to an electronic control unit 48 which functions as a master computer of the brake system 44. An electronic wheel module 49.1–49.4 that is divided into a control element 50 and an output element 51 is associated with the disk brakes 10.1 through 10.4. The control elements 50 are connected via a data bus 52 to the control unit 48; the control unit 48 and the wheel modules 49.1 through 10.4 are connected by lines 53 to a battery 54 for power supply. An electric control line 55 leads from the respective output element 51 to the friction clutch 32 of the appropriate disk brake 10.1 through 10.4. From the respective control element 50, a signal line 56 leads to an rpm sensor 57 that monitors the rotating behavior of the vehicle wheel associated with the appropriate disk brake 10.1 through 10.4.

When the brake pedal 45 is actuated, the electronic control unit 48 triggers the wheel modules 49.1 through 49.4, which meter the exiting current necessary for deceleration for the friction clutches 32. Because of the individual wheel monitoring of the wheel behavior by means of the rpm sensor 57, the braking force at every disk brake 10.1 through 10.4 can be adjusted to correspond to the requirements. In this way individual wheel control, such as for increasing driving stability, or for anti-skid protection or traction control, is possible.

The friction brake and the method in accordance with the invention can also be applied to or used in a drum brake.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the Unites States is:

1. A friction brake for vehicles which comprises a brake disk (13) that is connected coaxially to a vehicle wheel in a manner fixed against relative rotation; at least one friction lining (18.1, 18.2) associated with the brake disk (13); a clamping device (20) secured relative to said friction lining, a piston (23) within said clamping device for pressing the friction lining (18.1, 18.2) against the brake disk (13); a clutch (32) mechanically connected to the clamping device (20), a drive source for driving said clamping device via said clutch, said clutch is an electromagnetic friction clutch (32) which is disposed coaxially with said brake disk (13), a first half (33) of said electromagnetic friction clutch is stationary and a second half (35) is rotatably seated independently of the vehicle wheel and is brought into controllable frictional engagement with the brake disk (13), said second half (35) of the friction clutch (32) is in form-fitting rotational engagement with the piston (23) of the clamping device (20); and that the piston (23) is axially displaceable with a key driver (25) that is independent of the direction of rotation.

2. The friction brake as defined by claim 1, in which a first toothed wheel segment (38) is connected with said second half of said friction clutch and a second toothed wheel segment (39) is connected with said piston (23), the piston (23) of the clamping device (20) is rotatably seated on an axis parallel to the friction clutch (32), and said second half (35) of the friction clutch (32) is integral with said first toothed wheel segment (38) which is engaged with said second toothed wheel segment (39).

3. The friction brake as defined by claim 2, in which the piston (23) of the clamping device (20), with an axially grooved bearing (24), indirectly engages said at least one friction lining (18.2).

4. The friction brake as defined by claim 2, in which the piston (23) is supported, on a front face remote from the at least one friction lining (18.2), with roll bodies (28) on a roll surfaces (29) that form leading ramps, which starting at a resting position of the roll bodies (28), have a same inclination in both rotational directions of the piston (23).

5. The friction brake as defined by claim 1, in which the piston (23) of the clamping device (20), with an axially grooved bearing (24), indirectly engages said at least one friction lining (18.2).

6. The friction brake as defined by claim 1, in which the piston (23) is guided on its circumference in a friction bearing (21).

7. The friction brake as defined in claim 1, in which the piston (23) is supported, on a front face remote from the at least one friction lining (18.2), with roll bodies (28) on a roll surfaces (29) that form leading ramps, which starting at a resting position of the roll bodies (28), have a same inclination in both rotational directions of the piston (23).

* * * * *